March 5, 1929.　　　G. S. SHAAK　　　1,704,631
PIPE REAMER

Filed July 5, 1927

R. C. Thomas
WITNESS:

G. S. Shaak
BY Victor J. Evans
INVENTOR
ATTORNEY

Patented Mar. 5, 1929.

1,704,631

UNITED STATES PATENT OFFICE.

GEORGE S. SHAAK, OF AVON, PENNSYLVANIA.

PIPE REAMER.

Application filed January 5, 1927. Serial No. 159,170.

This invention relates to reamers, primarily designed for use upon smoking pipes, and its general object is to provide a reamer including a cutter member shaped to conform to the configuration of a pipe bowl in order that a cake formed in the bowl may be evenly cut.

Another object of the invention embodies a cup shaped member adapted to be fitted over the bowl of a pipe to center the cutter member carrying means and to collect the material cut from the bowl.

More specifically stated, the cutter member is adjustable to facilitate its application upon and within pipe bowls of various sizes and to cut the cake to a desired thickness.

With the above and other objects in view, the invention further includes the following novel features and details of construction, to be hereinafter more fully described, illustrated in the accompanying drawing and pointed out in the appended claims.

In the drawing:—

Figure 1:
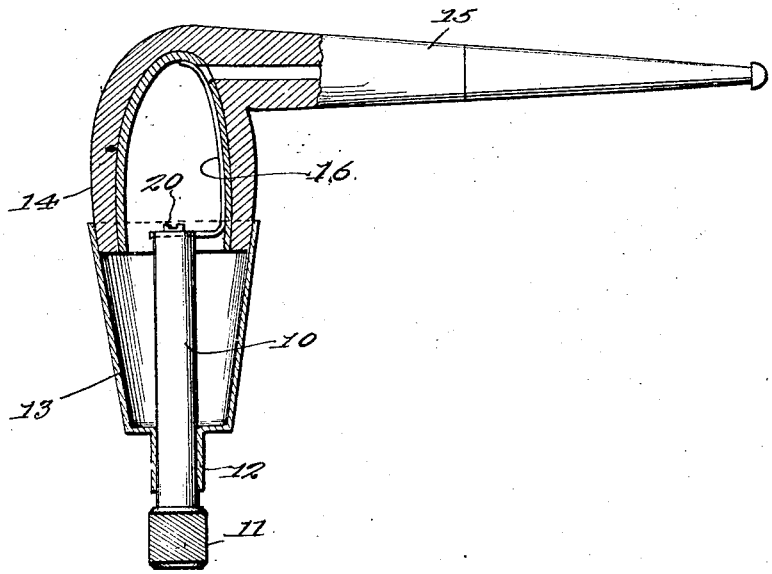
Figure 1 is a sectional view of the invention applied upon a pipe bowl partly broken away to illustrate the operation thereof.
Figure 3:
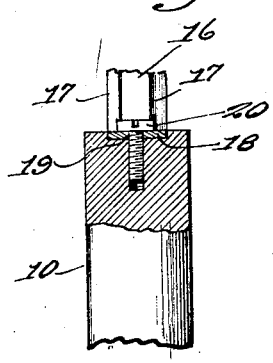
Figure 3 is a sectional view illustrating the adjusting means for the cutter member.
Figure 2:
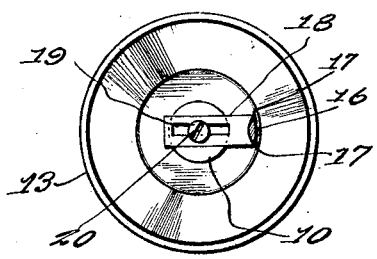
Figure 2 is a bottom plan view of the invention with the cutting blade in section.

Referring to the drawing in detail wherein like characters of reference denote corresponding parts, the reference character 10 indicates a shaft having a knurled or serrated head 11 provided upon one end and said shaft is mounted for slidable and rotatable movement through a sleeve portion 12 formed on a cup-shaped member 13. The cup-shaped member is tapered in order that the bowls 14 of various sizes and configurations of pipes such as indicated by the reference numeral 15 may be received therein as suggested in Figure 1.

A cutter blade 16 has its cutting portion curved upon itself to follow the interior configuration of a pipe bowl and is provided with oppositely disposed longitudinally arranged bevelled cutting edges 17. The offset end portion 18 of the cutter blade 16 is provided with a slot 19, for receiving an adjusting screw 20 threaded within the inner end of the shaft 10. By this construction, the cutting blade can be adjusted laterally with respect to the shaft whereby it can be arranged for fitting various sizes of bowls as will be apparent.

It will be noted from the illustration in Figure 1 of the drawing that the cutter blade 16 may be regulated upon the shaft 10 to scrape and cut the cake from the pipe bowl to any desired thickness and that the cup-shaped member 13 will collect the cake and other extraneous matter cut from the bowl. Said shaft is easily operable by the head 11 and may be readily rotated within the sleeve portion 12 of the cup-shaped member 13 when placed between the thumb and index finger.

The invention is susceptible of various changes in its form, proportions and minor details of construction, and the right is herein reserved to make such changes as properly fall within the scope of the appended claims.

Having thus described my invention what I claim is:—

1. A reamer for smoking pipes comprising a tapered cup shape member, a sleeve formed with the small end of said cup shape member and extending outwardly therefrom, a shaft mounted for slidable and rotatable movement in said sleeve, a serrated head formed with one end of said shaft and providing a handle, a cutting blade having opposed longitudinally arranged beveled cutting edges, a slotted offset end portion formed with said blade, means passing through said slot for adjustably securing the cutting blade to the opposite end of said shaft and said cutting blade having its cutting portion curved to conform to the interior configuration of a pipe bowl.

2. A smoking pipe reamer of the character described comprising a tapered cup shape member, a sleeve formed with said cup shape member, a shaft mounted for slidable and rotatable movement in said sleeve, a serrated head formed with one end of said shaft and providing a handle, a cutting blade having opposed longitudinally arranged beveled edges and being adjustably secured to the opposite end of said shaft for lateral movement with respect thereto and said cutting blade having its cutting portion shaped in a manner to conform to the interior configuration of a pipe bowl.

In testimony whereof I affix my signature.

GEORGE S. SHAAK.